United States Patent
Hirota et al.

[11] Patent Number: 5,987,922
[45] Date of Patent: Nov. 23, 1999

[54] MANUFACTURING METHOD FOR MOLDED GLASS ARTICLES

[75] Inventors: Shinichiro Hirota; Ken Uno; Kishio Sugawara; Kohichi Saitoh, all of Tokyo, Japan

[73] Assignee: Hoya Corporation, Tokyo, Japan

[21] Appl. No.: 09/080,959

[22] Filed: May 19, 1998

[30] Foreign Application Priority Data

May 19, 1997 [JP] Japan ..................................... 9-128772

[51] Int. Cl.⁶ ................................................. C03B 23/00
[52] U.S. Cl. .............................. 65/64; 65/29.1; 65/29.19; 65/102; 65/275
[58] Field of Search .................. 65/29.1, 29.19, 65/64, 275, 102

[56] References Cited

U.S. PATENT DOCUMENTS

| | | | |
|---|---|---|---|
| 4,915,720 | 4/1990 | Hirota et al. | 65/64 |
| 5,032,160 | 7/1991 | Murata et al. | 65/102 |
| 5,188,650 | 2/1993 | Nomura et al. | 65/64 |
| 5,228,894 | 7/1993 | Sato et al. | 65/102 |
| 5,762,673 | 6/1998 | Hirota et al. | 65/25.1 |
| 5,782,946 | 7/1998 | Komiyama et al. | 65/102 |
| 5,788,732 | 4/1998 | Nomura et al. | 65/64 |
| 5,817,161 | 10/1988 | Takagi et al. | 65/102 |

FOREIGN PATENT DOCUMENTS

| | | |
|---|---|---|
| 7-10556 | 1/1995 | Japan . |
| 8-133758 | 5/1996 | Japan . |
| 9-12317 | 1/1997 | Japan . |

*Primary Examiner*—Sean Vincent
*Attorney, Agent, or Firm*—Burns, Doane, Swecker & Mathis, L.L.P.

[57] ABSTRACT

A manufacturing method for molded glass articles including glass optical elements such as high precision lenses not requiring grinding and polishing after press molding. The manufacturing method according to the invention is a method for manufacturing the molded glass articles having a higher surface precision with a high productivity by pressing a glass material in a stepwise manner constituted of some steps depending on a temperature condition of the glass material.

29 Claims, 5 Drawing Sheets

MANUFACTURING METHOD FOR MOLDED GLASS ARTICLES

FIELD OF THE INVENTION

This invention relates to a method for manufacturing molded glass articles including glass optical elements such as high precision lenses, not requiring grinding and polishing after press molding. Particularly, this invention is to provide a method for manufacturing molded glass articles having a higher surface precision with a high productivity.

BACKGROUND OF THE INVENTION

Various molding methods for optical glass elements such as high precision lenses, using precisely fabricated molds made of a mold material, which can be finished to an optical surface, to which softened glass does not adhere, and which does not require grinding or polishing after press molding, have been developed recently. To obtain a required lens, the lens has to satisfy a specification such as lens thickness, outer diameter, eccentricity, as well as of surface shape precision and surface quality (smoothness on the surface). It is better for such a lens to have a good internal quality such as good refractive index and permeability as a matter of course.

To use such a molding method for glass optical elements as business, how much productivity would be gained may be a serious problem. That is, it is critical whether many glass optical elements can be produced in a short period.

One means to improve the productivity is to fabricate plural glass material pieces in parallel, and another means is to shorten the fabrication time per cycle. Various improved methods have been proposed, respectively. Shortening the fabrication time per cycle requires shortening heating and cooling periods of the molds, and therefore, various ideas are made to improve the glass material during molding and the temperature condition among the molding conditions.

For example, Japanese Unexamined Patent Publication No. 7-10,556 (hereinafter referred to as "Related art No. 1") describes a method for press-molding a glass material having a viscosity in a range of $10^7$ to $10^9$ poises with molds heated at a temperature that the glass material indicates a viscosity of $10^{10}$ to $10^{12}$ poises. Japanese Unexamined Patent Publication No. 9-12,317 (hereinafter referred to as "Related art No. 2") describes a method for press-molding a glass material having a viscosity in a range of $10^{5.5}$ to $10^9$ poises with molds heated at a temperature that the glass material indicates a viscosity of $10^8$ to $10^{12}$ poises (provided that the temperature of the molds is lower than that of the glass material).

Each method shortens the cycle time by shortening times for increasing and decreasing temperatures where the temperature of the mold is not raised more than a necessary temperature.

Moreover, in each method, to prevent the molding surface of the molds from becoming impaired, the glass material heated and softened at a place other than the molds is transferred into the molds before molding and is then molded.

Meanwhile, with such a method for molding glass optical elements, in addition to needs from production technology such as a shortened cycle time and prevention of impairments of molds, improved performance of the molded article is also sought. That is, there are also needs to provide optical elements having excellent optical property and meeting with needs.

Although the surface precision required for glass optical elements may vary depending on purpose of the glass optical elements or the like, power (Newton ring) as a scale of surface precision is required within±four fringes for ordinary use, and more preferably, within±two fringes, and irregularity (ASU) is required within one fringe, preferably, within 0.5 fringe.

With respect to the method set forth in an embodiment of Related art No. 1, surface precision of the molded glass optical element was measured. That is, where, after molded with pressure, a molded article is released without cooling down the article at the glass transition point or below (condition of Table 2 in Related art No. 1), it had power of 4 to 6 fringes and irregularity of 1 to 2 fringe and did not satisfy the above standard. In the case of Related art No. 2, it had power of 2 to 4 fringes and irregularity of 1 to 1.5 fringes and did not satisfy the above standard.

Furthermore, even under the same molding condition, the obtained surface precision might be different depending on the dimension of the glass molding material or the shape of the targeted molded article. Particularly, when the glass optical element relatively large whose outer diameter is 15 mm or more is molded, the method frequently failed to obtain a desired surface precision.

SUMMARY OF THE INVENTION

It is an object of the invention to provide a method for molding glass optical elements having an excellent surface precision and, more particularly, to provide a method for molding glass optical elements having power within±two fringes and irregularity within 0.5 fringe.

It is another object of the invention to provide a method for molding glass optical elements, even though the elements are relatively large, obtainable of a high surface precision such as power within±two fringes and irregularity within 0.5 fringe.

A first embodiment of the invention relates to a manufacturing method for molded glass articles comprising the steps of: initially pressing and molding a glass molding material having a viscosity in a range of $10^{5.5}$ to $10^8$ poises with a mold heated at a temperature that this glass molding material indicates a viscosity of $10^8$ to $10^{10.5}$ poises (providing that the temperature of the glass molding material is higher than the temperature of the mold); decreasing the temperatures of the mold and molded glass down to a glass transition point of the glass or below; and removing the molded glass from the mold, wherein from the completion of initial pressing to a decrease of the temperature down to the glass transition point or below, a pressure of 0.001 to 0.5 kg/cm² is continuously exerted to the molded glass.

A second embodiment of the invention relates to a manufacturing method for molded glass articles comprising the steps of initially pressing and molding a glass molding material having a viscosity in a range of $10^{5.5}$ to $10^8$ poises with a mold heated at a temperature that this glass molding material indicates a viscosity of $10^8$ to $10^{10.5}$ poises (providing that the temperature of the glass molding material is higher than the temperature of the mold); decreasing the temperatures of the mold and molded glass down to a glass transition point of the glass or below; and removing the molded glass from the mold, wherein from the completion of initial pressing to a decrease of the temperature down to the temperature that this glass molding material indicates a viscosity of $10^{9.5}$ to $10^{12}$ poises, a pressure in a range of 10 to 200 kg/cm² but smaller than a pressure of the initial pressing is continuously exerted to the molded glass, and then, until the temperature goes down to the glass transition point or below, a pressure of 0.001 to 0.5 kg/cm² is continuously exerted to the molded glass.

A third embodiment of the invention relates to a manufacturing method for molded glass articles comprising the steps of: initially pressing and molding a glass molding material having a viscosity in a range of $10^{5.5}$ to $10^8$ poises with a mold heated at a temperature that this glass molding material indicates a viscosity of $10^8$ to $10^{10.5}$ poises (providing that the temperature of the glass molding material is higher than the temperature of the mold); decreasing the temperatures of the mold and molded glass down to a glass transition point of the glass or below; and removing the molded glass from the mold, wherein: from the completion of initial pressing to a decrease of the temperature down to the temperature that this glass molding material indicates a viscosity of $10^{9.5}$ to $10^{12}$ poises, a pressure of 0.001 to 0.5 kg/cm² is continuously exerted to the molded glass; then, a pressure in a range of 10 to 200 kg/cm² but smaller than a pressure of the initial pressing is continuously exerted to the molded glass; then, until the temperature goes down to the glass transition point or below, a pressure of 0.001 to 0.5 kg/cm² is continuously exerted to the molded glass.

According to the manufacturing method for molded glass articles of the first embodiment of the invention, a high surface precision in which power is within±two fringes and irregularity is within 0.5 fringe can be obtained with respect to a biconvex lens or meniscus lens having a diameter of 20 mm or less. According to the manufacturing method for molded glass articles of the second and third embodiments of the invention, a high surface precision in which power is within±two fringes and irregularity is within 0.5 fringe can be obtained with respect to a large convex lens, a biconcave lens, and a lens having a large difference in center and edge thicknesses, which have a diameter of 20 mm or more, in addition to the small lenses above.

DETAILED DESCRIPTION OF THE PREFERRED EMBODIMENTS

Figure 1:
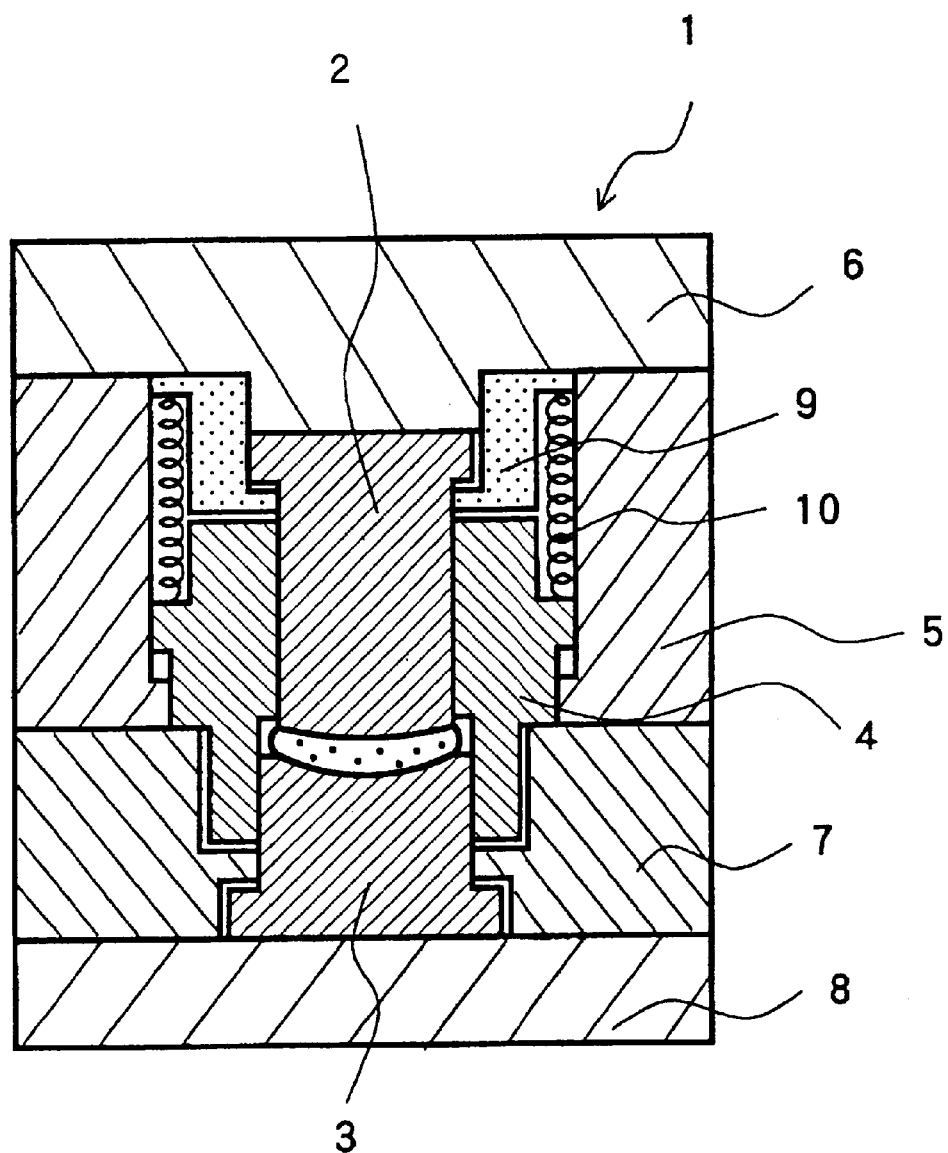
FIG. 1 is an illustration showing a mold used for a molding method according to a first embodiment of the invention.

This invention will be described as follows:

This invention is, according to any of first to third embodiments, a manufacturing method for molded glass articles comprising the steps of: initially pressing and molding a glass molding material having a viscosity in a range of $10^{5.5}$ to $10^8$ poises with a mold heated at a temperature that this glass molding material indicates a viscosity of $10^8$ to $10^{10.5}$ poises (providing that the temperature of the glass molding material is higher than the temperature of the mold); decreasing the temperatures of the mold and molded glass down to a glass transition point of the glass or below; and removing the molded glass from the mold.

The kind, shape, and the like of a glass constituting the glass molding material are what are conventionally known. The glass material can be, e.g., a glass preform, or a glass gob. The glass preform is referred to a molded article molded in a prescribed shape used as a previous body when a glass optical element is molded. The glass preform can be molded by cold molding or hot molding of melting glass or made, e.g., by polishing those molded to have a mirror surface. The surface can be not a mirror surface but a rough surface, and for example, a ground article ground by a diamond of #800 can be used as a glass preform.

The shape of the preform can be determined in consideration of tie size, capacity, and change amount when molded, etc., of the glass optical element as a product. To prevent a gas trap from occurring during molding, it is preferable to make the shape such that the center of the molded article first comes in contact with the molding surface of the preform. The shape of the glass preform can be, e.g., a ball shape, a slightly flatted shape, a disc shape, or a spherical shape.

On the other hand, the glass gob is a glass piece that melting glass is divided into pieces of a prescribed amount and may ordinarily have an irregular shape such as wrinkles. The glass preform is made by molding this glass gob into a prescribed shape.

With the method of this invention, the glass material is softened by heating up to a temperature corresponding to a viscosity in a range of $10^{5.5}$ to $10^8$ poises. When the viscosity of the glass material is $10^8$ poises or below, the glass material can be molded where adequately transformed with the mold preheated at a temperature corresponding to the viscosity of $10^8$ to $10^{10.5}$ poises. When the viscosity of the glass material is $10^{5.5}$ poises or above, the glass material is prevented from greatly deformed by its weight before molding. To make a good molding where the temperature of the mold is set to a relatively low temperature, it is proper that the glass material is softened by heating up to a temperature corresponding to $10^{6.5}$ to $10^{7.6}$ poises.

The preheating temperature of the molds is set to a temperature corresponding to $10^8$ to $10^{10.5}$ poises as a viscosity of the glass material. If the temperature is less than a temperature corresponding to a viscosity of $10^{10.5}$ poises, it is difficult to expand the glass material largely and to obtain a glass molded item having a thin edge thickness, as well as hard to obtain a high precision on the surfaces. If the temperature is more than a temperature corresponding to a viscosity of $10^8$ poises, the cycle time for molding becomes longer than needed, and the life of the molds becomes short. The preheating temperature of the molds is preferably set to a temperature corresponding to $10^8$ to $10^{9.6}$ poises as a viscosity of the glass material.

It is to be noted that the temperature of the mold is set lower than the temperature of the glass molding material. By this setting, the cycle time can be shortened, and the life of the mold can be made longer.

It is very preferable to set the upper mold temperature lower than the lower mold temperature at a starting time of the initial pressing from a viewpoint to prevent the molded article from sticking to the upper mold when the molds are released. More specifically, the upper mold temperature is properly set 5 or 20° C. lower than the lower mold temperature.

The mold used for this invention can be made of molds publicly, previously known as they are. The molding surface of the mold is preferably made of an amorphous and/or crystal, graphite and/or diamond, a carbon film constituted of a single component layer or mixed layer. In the mold having a mold surface constituted of the carbon film thus described, even if the temperature of the mold is the glass transition point of the glass material or above, the glass may not adhere upon melting (or firmly adhere).

The carbon film is formed by means such as a sputtering method, a plasma CVD method, a CVD method, an ion plating method, or the like. When the film is made by a sputtering method, it is preferable to make a sputtering under substrate temperature of 250 to 600 ° C., Rf power density of 5 to 15 W/cm$^2$, and vacuum degree while sputtering of $5 \times 10^{-4}$ to $5 \times 10^{-1}$ torr, in an inert gas such as Ar as a sputter gas, using a graphite as a sputter target.

When the film is made by a microwave plasma CVD method, it is preferable to made a film under a condition of substrate temperature of 650 to 1000° C., microwave electric power of 200 W to 1 kW, and gas pressure of $10^{-2}$ to 600 torr, using methane gas and hydrogen gas as a source gas.

When the film is made by an ion plating method, it is preferable to set the substrate temperature at 200 to 450° C. and to make benzene gas ionized.

These carbon chains include C—H bond.

In the invented molding method, the glass material softened by heating is initially pressed in the preheated mold. The condition of the initial pressing can be selected according to the temperature conditions of the glass material and the molds, and property of the glass material, etc. For example, the pressing time can be between 2 to 60 seconds. If it is set to 2 seconds or more, the glass can be adequately extended to obtain a glass optical element in a desired shape. A longer initial pressing may improve the surface precision that much, but if the pressing is too long, the cycle time cannot be shortened, and since the pressing may affect the life of the mold, the upper limitation is at most 60 seconds. The molding pressure can be determined in consideration with the temperature of the glass material and the temperature of the mold, etc., and it is proper to set the pressure, normally, in a range of 30 to 350 kg/cm$^2$. It is also more preferable to set the pressure in a range of 50 to 250 kg/cm$^2$, and it is preferable to finish the initial pressing at a time that the glass molding material becomes a molded glass having a prescribed thickness slightly thicker than the thickness of the final product, from a viewpoint to minimize thickness deviations of the final products.

The vicinity of the molding surface of the mold is cooled down at the same time to the start of the initial pressing or in a midway of or after the initial pressing, thereby cooling the mold to a glass transition point of the glass material or below. Cooling of the vicinity of the molding surface of the mold can make the cycle time shortened by an early start but can raise a surface precision by a deterred start of the cooling depending on the size and shape of the glass molding material. A proper start of cooling is zero to 20 seconds after the start of the initial pressing, or more preferably, 5 to 20 seconds after. The cooling rate can be determined in consideration with the cycle time and quality of the molded glass, and for example, it is proper to cool the glass at a rate of 20° C. per minute or more. The cooling rate can be slower than 20° C. per minute, but the cycle time of the molding becomes merely longer than the necessary time. The vicinity of the molding surface is preferably cooled at a rate of 20 to 180° C. per minute from a viewpoint for obtaining a high surface precision, though may vary depending on the size and shape of the molded glass articles.

With the first embodiment of the invention, a pressure of 0.001 to 0.5 kg/cm$^2$ (final pressing) is continuously exerted to the molded glass from the completion of initial pressing to a decrease of the temperature down to the glass transition point or below. The pressure of the final pressing to the molded glass is preferably 0.003 kg/cm$^2$ or more and 0.2 kg/cm$^2$ or below, from a viewpoint to further raise the surface precision.

At that time, the viscosity of the glass is, preferably, $10^{7.6}$ poises or more at a time starting tie final pressing, or namely, at a time that the initial pressing is finished. Where the initial pressing is ended with Such a viscosity, the initial pressing can bring a shape almost close to the final product, and then, the final pressing can maintain or improve the surface precision.

With the second embodiment of the invention, from the completion of initial pressing to a decrease of the temperature down to the temperature that this glass molding material indicates a viscosity of $10^{9.5}$ to $10^{12}$ poises, a pressure in a range of 10 to 200 kg/cm$^2$ but smaller than a pressure of the initial pressing (intermediate pressing) is continuously exerted to the molded glass, and then, until the temperature goes down to the glass transition point or below, a pressure of 0.001 to 0.5 kg/cm$^2$ (final pressing) is continuously exerted to the molded glass. From a viewpoint to a higher surface precision, the intermediate pressing from the completion of initial pressing to a decrease of the temperature down to the temperature that this glass molding material indicates a viscosity of $10^{9.5}$ to $10^{12}$ poises is preferably, 30 kg/cm$^2$ or more, and 100 kg/cm$^2$ or less. The final pressure going down to the glass transition point or below is preferably, 0.003 kg/cm$^2$ or more, and 0.2 k/cm$^2$ or less.

At that time, the viscosity of the glass is preferably, $10^{7.6}$ poises or more at a time starting the final pressing, or namely, at a time that the intermediate pressing is finished. Where the initial pressing is ended with such a viscosity, the intermediate pressing can bring a shape almost close to the final product, and then, the final pressing can maintain or improve the surface precision.

With the third embodiment of the invention, from the completion of initial pressing to a decrease of the temperature down to the temperature that this glass molding material indicates a viscosity of $10^{9.5}$ to $10^{12}$ poises, a pressure of 0.001 to 0.5 kg/cm$^2$ (intermediate pressing (1)) is continuously exerted to the molded glass; then, a pressure in a range of 10 to 200 kg/cm$^2$ but smaller than a pressure of the initial pressing (intermediate pressing (2)) is continuously exerted to the molded glass; then, until the temperature goes down to the glass transition point or below, a pressure of 0.001 to 0.5 kg/cm$^2$ (final pressing) is continuously exerted to the molded glass. From a viewpoint to a higher surface precision, the intermediate pressing (1) is preferably, 0.003 kg/cm$^2$ or more, and 0.2 kg/cm$^2$ or less, and the intermediate pressing (2) is preferably, 30 kg/cm$^2$ or more, and 100 kg/cm$^2$ or less. The final pressure going down to the glass transition point or below is preferably, 0.003 kg/cm$^2$ or more, and 0.2 kg/cm$^2$ or less.

At that time, the viscosity of the glass is, preferably, $10^{7.6}$ poises or more at a time starting the final pressing, or namely, at a time that the intermediate pressing is finished. Where the initial pressing is ended with such a viscosity, the intermediate pressing can bring a shape almost close to the final product, and then, the final pressing can maintain or improve the surface precision.

By cooling the vicinity of the molding surface while the intermediate pressing is executed during the above condition, an excellent surface precision is obtained with no occurrence of sink marks and distortions on the surface shape, and not only the center thickness can be maintained within a permissive tolerance but also a molded glass article having a desired surface precision can be obtained. It is to be noted that the intermediate pressing (1) of 0.001 to 0.5 kg/cm$^2$ and the final pressing to the molded glass can be given from the weight of an upper mold of the mold, and the weight of the upper mold of the mold is preferably determined in consideration of this point.

Moreover, the final pressing of 0.001 to 0.5 kg/cm$^2$ is preferably exerted at a temperature between the glass transition point and a temperature 50° C. below the glass transition point, from a viewpoint to obtain a good precision and, at the same time, to make the cycle time not too long.

According to the condition of the first embodiment of the invention, if the molded glass article is relatively small (having a diameter of about 20 mm or less), a molded article having power within±two fringes and irregularity within 0.5 fringe can be obtained easily. As a relatively small molded glass article, for example, a biconvex lens, and a meniscus lens are exemplified.

According to the condition of the second and third embodiments of the invention, if the molded glass article is relatively large (having a diameter of about 20 to 30 mm), a molded article having power within±two fringes and irregularity within 0.5 fringe can be obtained easily. As a relatively large molded glass article, for example, a convex lens, a biconcave lens, a lens having a large difference between the center and edge thicknesses, which have a diameter more than 20 mm, are exemplified.

In the first embodiment of the invention, from a viewpoint to maintain the permissive tolerance of the center thickness of the final product, the center thickness of the glass material softened by heating is preferably kept in a range of tolerance±0.03 mm. Since the pressure is quickly reduced during the final pressing and since the glass is at a high viscosity (about $10^{7.6}$ (poises or more), the center thickness can be deformed by pressure by only about 0.001 mm, In the second and third embodiments of the invention, it is preferable that the initial pressing is so made that the center thickness of the glass material softened by heating comes in a range from 0.03 mm smaller than the center thickness of the final product to 0.15 mm larger than the center thickness and then that the intermediate pressing is made, from a viewpoint to maintain the permissive tolerance of the center thickness of the final product. That is, since the pressure is quickly reduced during the intermediate pressing and since the glass is at a high viscosity (about $10^{7.6}$ poises or more), the center thickness can be deformed by pressure by only about 0.001 to 0.12 mm, and therefore, the final center thickness easily comes in a range of a tolerance±0.03 mm.

The initial and intermediate pressings are performed by stopping the initial pressing made to the glass material softened by heating by a pressing stopping means for stopping the initial pressing so as to obtain a desired center thickness in a range from 0.03 mm smaller than the center thickness of the final product to 0.15 mm larger than the center thickness and by starting the intermediate pressing before or simultaneously at the stop of the initial pressing. The final product is obtained with a desired center thickness, and it is desirable that a surface precision is free from its loss because the pressing is done continuously between the initial and intermediate pressings. When a further intermediate pressing is made upon obtaining a desired center thickness by means of an external stopper mechanism or the like, the pressing may be stopped for a moment, and therefore, an excellent surface precision tends to be hardly obtained. The initial and intermediate pressings can be done by a double cylinder mechanism.

In the above first to third embodiments, the initial pressing is a pressure exerted to the mold, and until the stop by means of the external stopper mechanism, this pressure is exerted to the glass material. In the intermediate and final pressings, the prescribed pressure is exerted to the glass material during those pressings.

The molded glass articles subject to the press-molding and the subsequent cooling is released from the mold after the temperature around the molding surface is decreased to the glass transition temperature or below. If the temperature goes down to the glass transition temperature or below, a glass's viscous flow does not occur in a short time, and the glass can be deemed as solidified. Consequently, the molded glass article does not deform after released from the mold, so that the article can have an excellent surface precision. Releasing the molded glass article from the mold is preferably performed immediately after the end of the final pressing. Since the final pressing of 0.001 to 0.5 kg/cm$^2$ as described above is preferably done a temperature between the glass transition point and a temperature 50° C. below the glass transition point, the release of the molded glass article is properly done at a temperature in the above range.

It is preferable to release the molded glass article first from the upper mold and subsequently from the lower mold after the molded glass article is cooled below the glass transition point or below. This is because, if the article is released first from the lower mold, the molded glass clinging to the upper mold may drop after separation of the upper and lower molds, thereby likely causing breaking the molded glass article and stop of operation of the apparatus.

Moreover, It is preferable to set the temperature of the upper mold lower than the temperature of the lower mold at a time that the molded glass article is removed from the mold from a viewpoint to prevent the molded glass article from clinging to the upper mold. More specifically, it is proper to set the upper mold temperature 5 to 20° C. lower than the lower mold temperature.

There is no special limitation on the mold used for the molding method of the invention. To heat the mold, a resistance heater, a microwave (or high frequency) heater, or an infrared lamp heater, etc. can be used. For shortening the restoring time of the mold temperature, the microwave heater and the infrared lamp heater are preferable. Cooling of the mold can be done by cooling upon electric power stop or cooling gas communicating through the mold inside.

Figure 2:
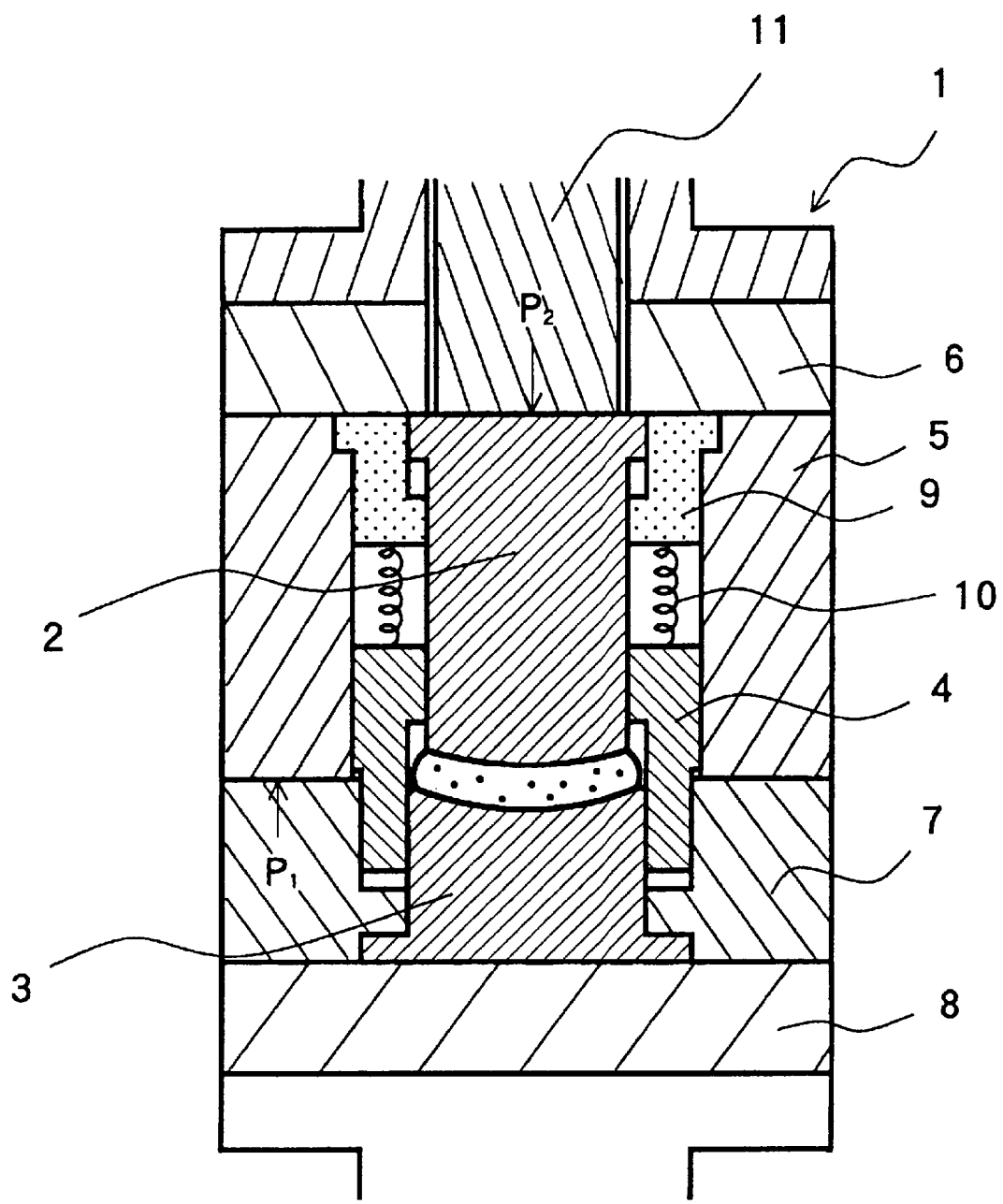
FIG. 2 is an illustration showing a mold used for a molding method according to second and third embodiments of the invention.

For the molding method according to the invention, for example, a mold 1 as shown in FIGS. 1, 2 can be used. In FIG. 1, the mold 1 is constituted of an upper mold 2, a lower mold 3, a sleeve 4, upper matrices 5, 6, lower matrices 7, 8, a stopper ring 9 for the upper mold, springs 10, and a secondary (intermediate) pressing bar 11.

As the upper mold, the lower mold, and the sleeve of the mold, for example, silicon carbide silicon, silicon nitride, tungsten carbide, cermet of aluminum oxide and titanium carbide, or those covered with diamond, refractory metal, noble metal alloy, or ceramic such as carbide, nitride, boride , oxide, or the like can be used. Particularly, a silicon carbide film is formed on a sintered silicon carbide by the CVD method, and after the item is fabricated in a final form, a carbon film made of a single component layer or mixed layer made of an amorphous film such as an i-carbon film and/or a crystal graphite and/or diamond is preferably formed by an ion plating method or the like. The reason is that the carbon film may not melt and adhere even if used for molding where the mold temperature is relatively high and that the carbon film can easily release the mold at a relatively high temperature because of well mold releasing property thereof.

The upper and lower matrices and the ring can be made of a metal, and the spring can be made of a ceramic.

The mold 1 is attached in a press machine in which a high frequency coil is disposed, to perform molding.

Figure 4:
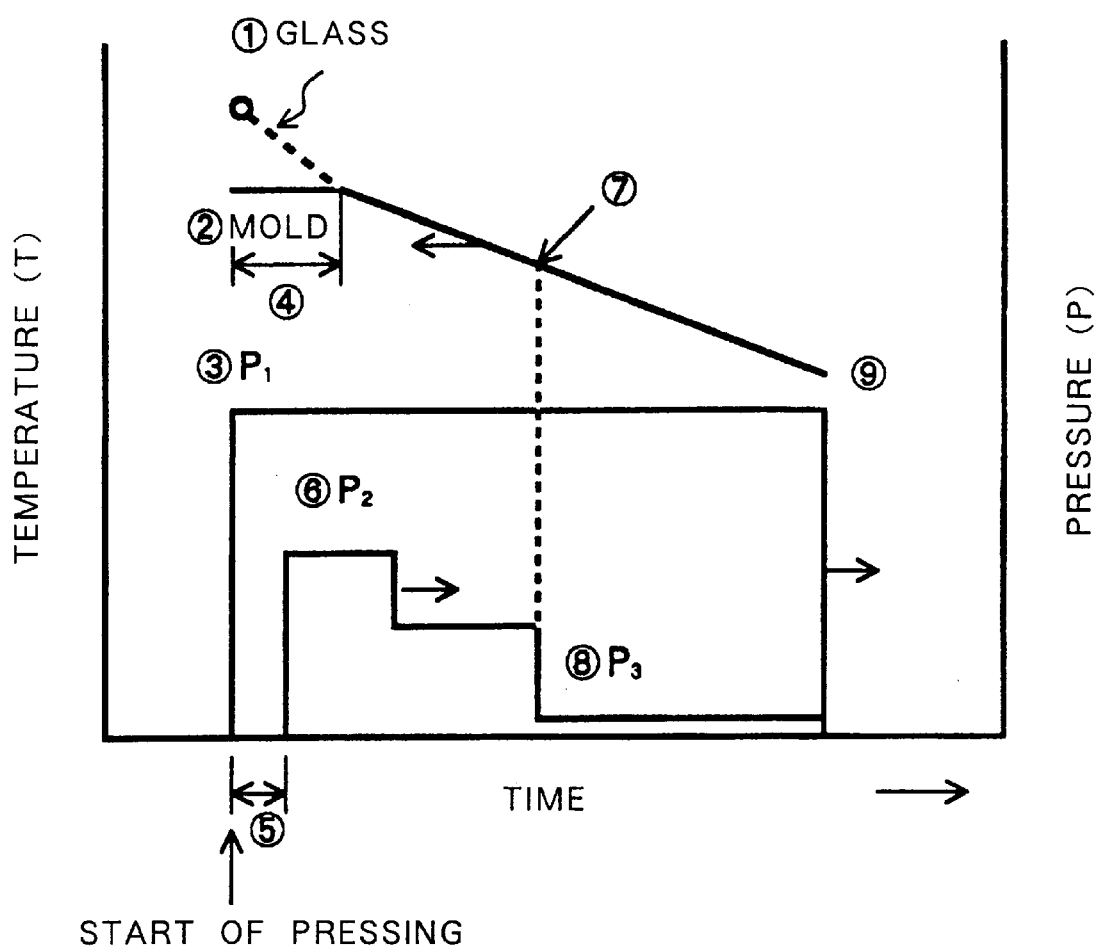
FIG. 4 is a schedule diagram of temperature and pressure condition of the molding method (the second embodiment) of the invention.

A temperature and pressing condition for the molding method of the invention is described in reference to FIG. 4, in use of the second embodiment of the invention, where the molding apparatus shown in FIG. 2 is used. In FIG. 4, a left vertical axis indicates temperature; a right vertical axis indicates pressure; a horizontal axis indicates time.

$\hat{1}$ The temperature of the glass material is a temperature corresponding to that the viscosity of the glass material is in a viscosity range $10^{5.5}$ to poises (preferably, a temperature corresponding to $10^{6.5}$ to $10^{7.6}$ ( poises).

$\hat{2}$ The preheating temperature of the mold is a temperature corresponding to the viscosity of the glass material of $10^8$ to $10^{10.5}$ poises (preferably, a temperature corresponding to the viscosity of the glass material of $10^8$ to $10^{9.6}$ poises).

$\hat{3}$ The initial pressing P1 starts. It is done with a pressure in a range of 30 to 350 kg/cm$^2$, preferably, in a range of 50 to 250 kg/cm$^2$. The initial pressing is executed by elevating the lower matrices 7, 8 with respect to the upper matrices 5, 6 in the mold shown in FIG. 1. Since the glass material is a viscous body, the pressure in fact is not exerted while the material is extending under the pressure, and the pressure is a value in which the pressure is divided by a cross-sectional area of the extended lens. The initial pressing time is a time (about 2 to 60 seconds) that the upper and lower matrices 5, 7 come in contact with each other where the glass material comes to have the prescribed thickness. After the upper and lower matrices 5, 7 come in contact with each other, the initial pressing is not exerted to the glass.

$\hat{4}$ The temperature of the mold is maintained for zero to 20 seconds after the start of the initial pressure, preferably for 5 to 20 seconds, and then, cooling starts. The cooling rate is 20 to 180° C. per minute (from a viewpoint to obtain a high surface precision).

$\hat{5}$ The intermediate pressing P2 starts, e.g., after 5 to 20 seconds after the start of the initial pressing. The intermediate pressing can start before the end of the initial pressing, and in such a case, the glass material receives a pressure of P1+P2. The pressure P1+P2 is a pressure in a range of 30 to 350 kg/cm$^2$, which is substantially equivalent to the initial pressing, preferably, 50 to 250 kg/cm$^2$.

$\hat{6}$ The intermediate pressing P2 is in a range of 10 to 200 kg/cm$^2$ (preferably, 10 kg/cm$^2$ to 150kg/cm$^2$) and smaller than the pressure of the initial pressing. It is to be noted that the intermediate pressing P2 can be reduced in a midway as shown in FIG. 4.

$\hat{7}$ The final pressing P3 starts. It is done at a temperature that the glass indicates a viscosity in a range of $10^{9.5}$ to $10^{12}$ poises.

$\hat{8}$ The final pressing P3 is in a range of 0.001 to 0.5 kg/cm$^2$ (preferably, 0.003 kg/cm$^2$ to 0.2 kg/cm$^2$).

$\hat{9}$ The temperature of mold releasing is a temperature between the glass transition point and a temperature 50° C. below the glass transition point.

Figure 5:
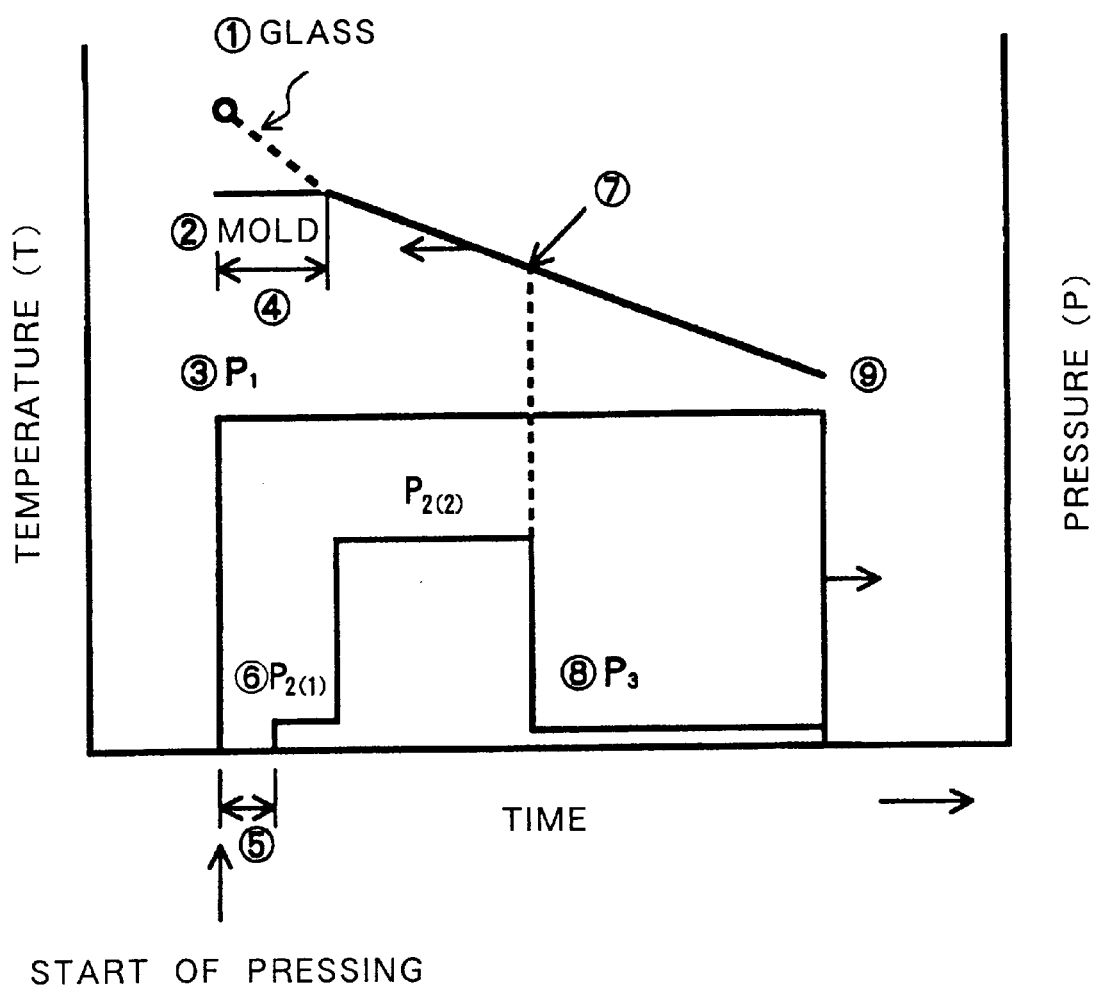
FIG. 5 is a schedule diagram of temperature and pressure condition of the molding method (the third embodiment) of the invention.

A temperature and pressing condition for the molding method of the invention is described in reference to FIG. 5, in use of the third embodiment of the invention, where the molding apparatus shown in FIG. 2 is used. In FIG. 5, a left vertical axis indicates temperature; a right vertical axis indicates pressure; a horizontal axis indicates time.

$\hat{1}$ to $\hat{4}$ are substantially the same as those in the second embodiment.

$\hat{5}$ The intermediate pressing (1) P2(1) starts alter 5 to 20 seconds after the initial pressing starts.

$\hat{6}$ The intermediate pressing (1) P2(1) is in a range of 0.001 to 0.5 kg/cm$^2$ (preferably, 0.003 kg/cm$^2$ to 0.2 kg/cm$^2$). The intermediate pressing (1) P2(1) is done, e.g., for 5 to 12 seconds. Then, the intermediate pressing (2) P2(2) is implemented. The intermediate pressing (2) P2(2) is in a range of 10 to 200 kg/cm$^2$ (preferably, 10 kg/cm$^2$ to 150 kg/cm$^2$) and smaller than the pressure of the initial pressing. It is to be noted that the intermediate pressing (2) P2(2) can be reduced in a midway in substantially the same manner as shown in FIG. 4.

$\hat{7}$ The final pressing P3 starts. It is done at a temperature that the glass indicates a viscosity in a range of $10^{9.5}$ to $10^{12}$ poises.

$\hat{8}$ The final pressing P3 is in a range of 0.001 to 0.5 kg/cm$^2$ (preferably, 0.003 kg/cm$^2$ to 0.2 kg/cm$^2$).

$\hat{9}$ The temperature of mold releasing is a temperature between the glass transition point and a temperature 50° C. below the glass transition point.

In the molding method of the invention, the glass material can be softened by heating where the glass material is floated by airflow, and the glass material softened by heating is transferred to the preheated mold.

It is very difficult to prevent the glass from adhering to the jig for maintaining the glass material at a time of heating where the glass material is in a low viscosity area such that the glass material may deform by weight. To solve this difficulty, blowing gas from the inside of the jig to make the glass material floating by the airflow allows to form a gas layer on both sides of the jig and the glass, thereby consequently softening the glass by heating without reaction between the jig and the glass. When the glass material is preform, the preform can be softened by heating while the shape of the preform is maintained. When the glass material is a glass gob and even where the gob is in an irregular shape and has some surface defects such as wrinkles on the surface, the shape can be regulated and the surface defects can be eliminated, by floating the glass by airflow while the glass is softened by heating.

Floating of the glass material and transfer of the glass material softened by heating is done in a way as set forth in, e.g., Japanese Unexamined Patent Publication, Heisei No. 8-133,758. The heating of the glass material includes a case where it is heated from the normal temperature to a predetermined temperature, a case where a glass material at a certain temperature is used and further heated, and a case where a glass material already heated at a certain temperature is used. For example, when the glass material is a glass gob, the glass gob produced from a melting glass can be used without cooling it.

According to the molding method of the invention, various glass materials having an excellent surface precision can be manufactured. Particularly, in this invention, glass optical elements such as a glass lens, and a prism, etc. are exemplified as glass materials. There is no limitation on the kind of the glass lens, and for example, a spherical or a spherical convex lens, and a meniscus lens, etc. are exemplified, but not limited to those.

According, to this invention, a method for molding glass optical elements having an excellent surface precision can be provided in which the cycle time necessary for press-molding is greatly shortened and in which the glass optical elements are formed by press-molding of a glass material such as glass preforms softened by heating with the preheated mold. According to the invention, particularly, the glass optical elements can be provided whose power is within±two fringes and whose irregularity is within 0.5 fringe. More specifically, according to the manufacturing method for the molded glass articles of the first embodiment of the invention, a high surface precision in which the power is within±two fringes and irregularity is within 0.5 fringe is obtainable for, e.g., a biconvex lens or meniscus lens having a diameter of 20 mm or less. According to the manufacturing method for molded glass articles of the second and third embodiments of the invention, a high surface precision in which power is within±two fringes and irregularity is within 0.5 fringe is obtainable for, e.g., a large convex lens, a biconcave lens, a lens having a large difference in center and edge thicknesses, which have a diameter exceeding 20 mm, in addition to the small lenses above.

EXAMPLES

Before a description of Examples, a relation between temperature and viscosity of a used barium borosilicate glass (transition point 514° C., sag point 545° C.) is shown in Table 1. Viscosity is important because temperature may vary depending on the kind of the glass.

TABLE 1

| | |
|---|---|
| 680° C. | $10^{5.8}$ poises |
| 643 | $10^{6.6}$ |
| 618 | $10^{7.3}$ |
| 615 | $10^{7.4}$ |
| 596 | $10^{8.0}$ |
| 590 | $10^{8.2}$ |
| 578 | $10^{8.7}$ |
| 567 | $10^{9.2}$ |
| 558 | $10^{9.7}$ |
| 549 | $10^{10.2}$ |
| 543 | $10^{10.7}$ |
| 531 | $10^{11.7}$ |

EXAMPLE 1

FIG. 1 shows a mold used in Examples. The mold 1 is constituted of an upper mold 2, a lower mold 3, a sleeve 4, upper matrices 5, 6, lower matrices 7, 8, a stopper ring 9 for the upper mold, and springs 10. The upper and lower molds and the sleeve is made of a silicon carbide, and a carbonic thin film is covered on the molding surface of the upper and lower molds. The upper and lower matrices, and the ring are made of a metal, and the springs are made of a ceramic.

An example in which a barium borosilicate glass (transition point 514° C., sag point 545° C.) is molded into a lens in a meniscus shape having a press outer diameter of 15 mm is described in referring to FIGS. 3(a)–(g).

Figure 3:
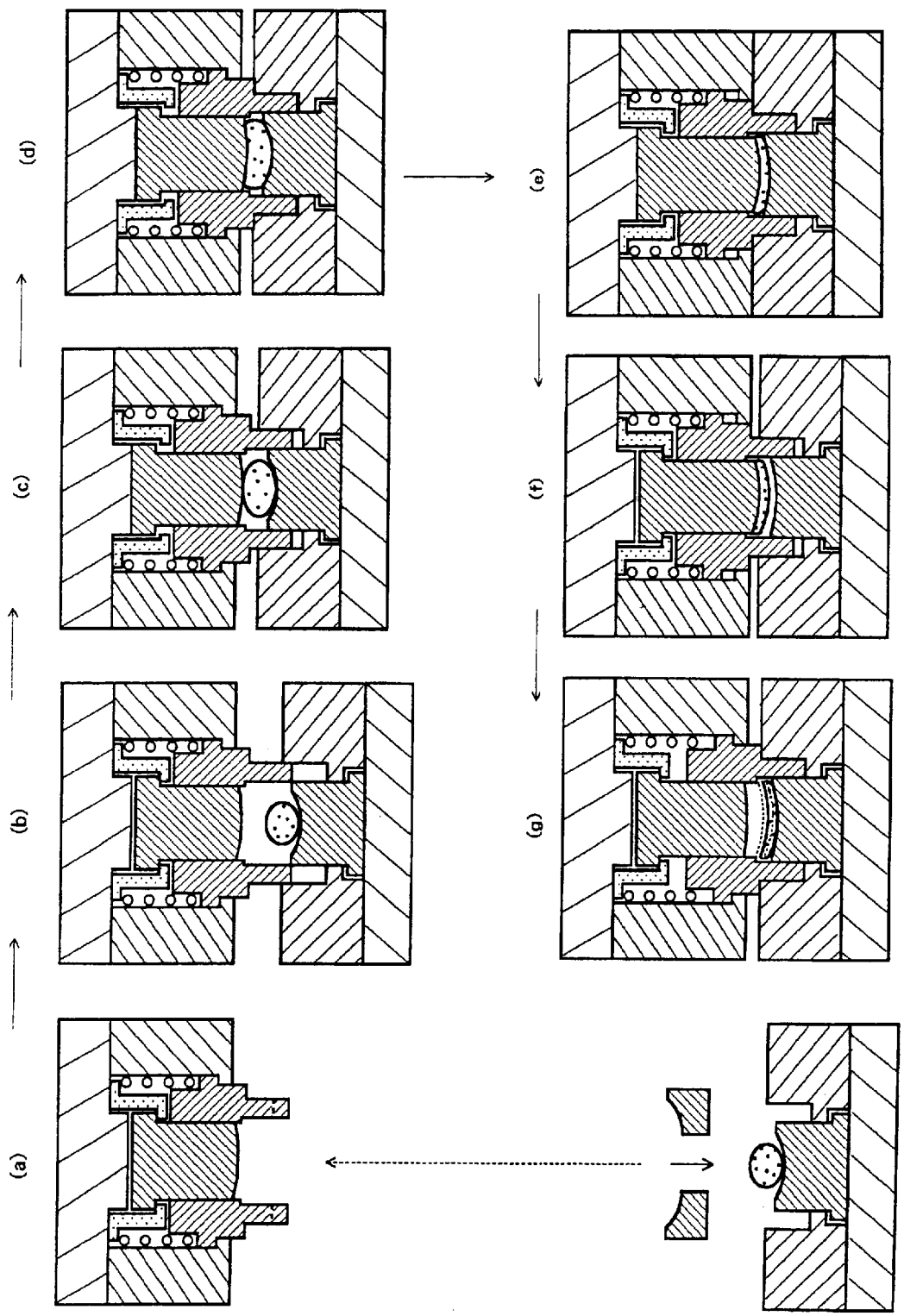
FIGS. 3(*a*), 3(*b*), 3(*c*), 3(*d*), 3(*e*), 3(*f*) and 3(*g*) provide an illustration showing an operating situation of the molding method of the invention in use of the mold shown in FIG. 1.

A preform hot molded into a slightly flatted shape free from surface defects is preheated to 643° C. (temperature that the glass viscosity corresponds to $10^{6.6}$ poises), and the preform is transferred by a sucking pad not shown onto the lower mold heated at about 567° C. (temperature that the glass viscosity corresponds to $10^{9.2}$ poises) at a lower portion of a mold chamber (FIG. 3a). The lower mold is immediately moved up to start pressing with a pressure of 100 kg/cm². FIG. 3c shows a start of pressing; FIG. 3d shows a midway of pressing; FIG. 3e shows a situation that the lower mold is totally pushed. At that time, the upper and lower matrices come to contact with each other, thereby defining the center thickness of the lens. The sleeve that urged downward by spring force is pushed up, and enters in a situation as shown in FIG. 3e. The outer diameter of the pressed article is, at that time, so pressed as to be slightly larger than the outer diameter of the molding surface of the upper mold, and does not hit the sleeve because the sleeve has a structure as shown in the drawing. The sleeve fits in the upper and lower molds with a narrow clearance and prevents the upper and lower surfaces of the lens from shifting axially by sliding movements.

Then, the mold and the molded lens are cooled at a cooling rate of 70° C. per minute so that the temperature goes down to the glass transition point or less. The upper mold at that time follows shrinkage of the glass, and the glass is cooled under a state that the glass receives only the weight of the upper mold (a pressure of 0.005 kg/cm²). That is, the top face of the lens keeps in contact with the upper mold during cooling. Because of this, the lens after mold releasing has a good surface precision. The lower mold is moved down at 500° C. to release the mold. These situations are shown in FIGS. 3f, 3g. At a moment that the lower mold is slightly moved down, the lens is in a meniscus form, so that the lens is easily separated form the lower mold but clings to the upper mold (FIG. 3f). The sleeve moves down by the spring force at the same time as down movement of the lower mold, and a stepwise portion of the sleeve hits the top edge of the pressed item, thereby pushing the lens downward. The upper mold, though slightly moves down at that time, does not go down further because a bottom of an upper mold flange portion hits a holder. Consequently, the lens is separated from the upper surface thereof and drops on the lower mold (FIG. 3g). The lower mold is moved down below the molding chamber, and the lens is removed with a sucking pad, not shown. The removed lens may be subject to annealing when necessary. The obtained lens has a high surface precision, a good surface quality, and a good eccentricity after centering. Table 2 shows surface precision.

A preform polished in a spherical form or a form close to the final product is used, and the temperature when the pressing starts is set to a temperature corresponding to a glass viscosity of $10^{6.3}$ and $10^{7.3}$ poises, respectively. Where the molding condition is partly changed, but other conditions are set as the same as above, and good results are obtained upon pressings. The molding conditions and results are shown in Table 2.

TABLE 2

| | When initial pressing starts | | Initial | Mold | | |
|---|---|---|---|---|---|---|
| No. | Preform temperature (viscosity) | Mold temperature (viscosity) | pressing time | releasing temperature | Power (fringe) | Irregularity (fringe) |
| 1 | 643 ($10^{6.6}$) | 567 ($10^{9.2}$) | 5 | 485 | within ± 2 fringes | within ± 0.5 fringe |
| 2 | 655 ($10^{6.3}$) | 558 ($10^{9.7}$) | 5 | 495 | within ± 2 fringes | within ± 0.5 fringe |
| 3 | 618 ($10^{7.3}$) | 578 ($10^{8.7}$) | 10 | 505 | within ± 2 fringes | within ± 0.5 fringe |

Temperature: ° C., viscosity: poise, temperature releasing initial pressing: a temperature of only upper mold weight.

EXAMPLE 2

A mold used here has the same mold structure shown in FIG. 1 of the first embodiment except that the mold is slightly larger where the press outer diameter is 30 mm, that a hole is formed in a center top of the upper matrix to make the second pressing, and that a pressing bar 12 for second pressing made of the same material as the upper matrix is disposed in the hole (FIG. 2).

In this Example, the preform and the mold are heated separately. The preform is softened by heating upon floating the preform over a separable floating plate capable of blowing gas from a lower side of the preform (in complying with a method set forth in Japanese Unexamined Patent Publication, Heisei No. 8-133,758). The floating plate is transferred right above the lower mold, opened quickly to left and right, thereby dropping the softened preform on the lower mold heated at a prescribed temperature. The lower mold is immediately moved up in the molding chamber, and a press is made with a pressure of 150 kg/cm$^2$ with the upper mold heated at a prescribed temperature. Cooling starts at a cooling rate of 30° C. per minute immediately after the upper and lower matrices come in contact with each other, and upon pushing the center with the pushing bar, the second pressing is made at a low pressure (40 kg/cm$^2$). The second pressing is stopped where the glass viscosity is between $10^{9.5}$ to $10^{12}$ during the cooling, and the glass is cooled down to the glass transition point or below where the pressure exerted to the glass is changed to only the weight of the upper mold (0.007 Kg/cm$^2$). The glass is then removed after the mold is released in the same manner as in Example 1.

The molding conditions and physical property of Example 2 are shown in Table 3.

TABLE 3

| No. | When initial pressing starts Preform temperature (viscosity) | Mold temperature (viscosity) | Pressing stop temperature (viscosity) | Mold releasing temperature | Power (fringe) | Irregularity (fringe) |
|---|---|---|---|---|---|---|
| 1 | 680 ($10^{5.8}$) | 549 ($10^{10.2}$) | 531 ($10^{11.7}$) | 485 | within ± 2 fringes | within ± 0.5 fringe |
| 2 | 643 ($10^{6.6}$) | 567 ($10^{9.2}$) | 543 ($10^{10.7}$) | 495 | within ± 2 fringes | within ± 0.5 fringe |
| 3 | 615 ($10^{7.4}$) | 590 ($10^{8.2}$) | 558 ($10^{9.7}$) | 505 | within ± 2 fringes | within ± 0.5 fringe |

Temperature: ° C., viscosity: poise, temperature releasing initial pressing: a temperature of only upper mold weight.

The preforms used in Numbers 2, 3 are preforms hot-molded into a slightly flatted shape free from surface defects in the same manner as in Example 1. Number 1 is for a spherical preform ground by a #800 diamond, but heating of the preform erased a sand texture, and resulted in a good form which has substantially the same surface quality as Numbers 2, 3 after the pressing.

Extension by the second pressing after the initial pressing was so small, and therefore, the center thickness was settled within the specification. The obtained lens, though larger than that in Example 1, had a high surface precision because a low pressure was maintained in a viscosity area at an initial stage of cooling and because in a viscous elasticity area the glass receives only the upper mold weight to keep contact with the upper mold in following the shrinkage of the glass. It is to be noted that a good surface precision was obtained even where cooling started simultaneously with the start of the pressing. Releasing was good by the same mechanism as in Example 1. The obtained lens was used upon annealing.

After the lens is removed upon releasing the mold, the mold is restored to regain the mold temperature, and the subsequent molding is executed. With this method, a successive molding can be done with very speedy cycle time.

It is to be noted that when the lens is large and its required precision is higher, mold-releasing may be done upon decreasing a temperature down to the stress point (478° C. for this glass) or below.

EXAMPLE 3

A meniscus lens was pressed having an a spherical top face close to a flat surface in a manner same as in Example 2. Mold releasing property of the glass with respect to the upper mold became slightly worse where the shape is close to the flat surface, and the mold releasing temperature was required down under the same conditions as in Example 2. When the mold releasing temperature is decreased, the cycle time becomes longer. To recoup with this problem, the springs might be made stronger, but here, a method to differentiate the temperature between the upper and lower molds was used. The average temperatures of the upper and lower molds were set as same as those in Table 2 of Example 2, and the upper temperature was reduced by about 10° C. in comparison with the lower mold. Consequently, since close contacting feature of the upper mold when pressed became worse in comparison with that of the lower mold, the glass was released first from the upper mold and could be removed easily from the lower mold. The surface precision becomes worse when the temperature differential between the upper and lower molds exceeds 20° C. When the spring is eliminated where the upper and lower molds are at different temperatures, failures occurred in mold releasing from the upper mold.

EXAMPLE 4

A preform made from barium borosilicate glass (transition point 514° C., sag point 545° C.) and hot-molded into a slightly flatted shape in the same manner as Examples 1, 2, free from surface defects was molded into a biconvex lens having a press outer diameter of 15 mm or a convex meniscus lens having a press outer diameter of 22 mm. The molding conditions are shown in Tables 4A and 4B (first embodiment), Tables 5A, 5B and 5C (second embodiment), and Tables 6A, 6B and 6C (third embodiment). Consequently, the surface precision of obtained molded glass articles was that power within±two fringes and irregularity within 0.5 fringe, and no defect such as crack, furrow, or dent was found.

TABLE 4A

| No | Lens diameter & Shape | Glass | Logarithmic indication of average viscosity (poise) when pressing starts Average of upper and lower molds* | Temperature difference between upper and lower molds* | Initial pressure (kg/cm$^2$) |
|---|---|---|---|---|---|
| 1 | ø 15 mm, Biconvex | 6.0 | 10.00 | 0 | 150 |
| 2 | ø 15 mm, Biconvex | 7.0 | 9.0 | 0 | 150 |
| 3 | ø 15 mm, Biconvex | 7.8 | 8.2 | 0 | 250 |

TABLE 4A-continued

| No | Lens diameter & Shape | Glass | Average of upper and lower molds* | Temperature difference between upper and lower molds* | Initial pressure (kg/cm²) |
|---|---|---|---|---|---|
| | | Logarithmic indication of average viscosity (poise) when pressing starts | | | |
| 4 | ⌀ 15 mm, Biconvex | 7.0 | 9.0 | -15 | 150 |
| 5 | ⌀ 15 mm, Biconvex | 7.0 | 9.0 | 0 | 150 |

*Mold temperature is shown by converted viscosity of glass.

TABLE 4B

| No | Time for maintaining constant temperature (sec) | Cooling rate (°C./min) | Final pressing start time (seconds after) | Final pressure (Kg/cm) | Mold releasing temperature (°C.) |
|---|---|---|---|---|---|
| 1 | 12 | 100 | 13 | 0.01 | 484 |
| 2 | 12 | 100 | 15 | 0.01 | 494 |
| 3 | 10 | 100 | 15 | 0.01 | 504 |
| 4 | 12 | 100 | 15 | 0.01 | 494 |
| 5 | 12 | 100 | 15 | 0.40 | 494 |

TABLE 5A

| No | Lens diameter & Shape | Glass | Average of upper and lower molds* | Temperature difference between upper and lower molds* | Initial pressure (kg/cm²) |
|---|---|---|---|---|---|
| | | Logarithmic indication of average viscosity (poise) when pressing starts | | | |
| 6 | ⌀ 22 mm, Convex-meniscus | 6.0 | 10.00 | 0 | 100 |
| 7 | ⌀ 22 mm, Convex-meniscus | 7.0 | 9.0 | 0 | 150 |
| 8 | ⌀ 22mm, Convex-meniscus | 7.8 | 8.2 | 0 | 200 |
| 9 | ⌀ 22 mm, Convex-meniscus | 7.0 | 9.0 | -15 | 150 |
| 10 | ⌀ 22 mm, Convex-meniscus | 7.0 | 9.0 | 0 | 150 |
| 11 | ⌀ 22 mm, Convex-meniscus | 7.0 | 9.0 | 0 | 150 |

*Mold temperature is shown by converted viscosity of glass.

TABLE 5B

| No | Time for maintaining constant temperature (sec) | Cooling rate (°C./min) | Intermediate pressing start time (seconds after) |
|---|---|---|---|
| 6 | 20 | 150 | 10 |
| 7 | 10 | 150 | 15 |
| 8 | 15 | 150 | 10 |
| 9 | 10 | 150 | 15 |
| 10 | 10 | 150 | 15 |
| 11 | 10 | 150 | 15 |

TABLE 5C

| No | Intermediate pressure (kg/cm²) | Viscosity when Intermediate pressing ends (logarithm indication) | Final pressure (Kg/cm) | Mold releasing temperature (°C.) |
|---|---|---|---|---|
| 6 | 20 | 11.0 | 0.01 | 484 |
| 7 | 30 | 10.5 | 0.01 | 494 |
| 8 | 50 | 10.0 | 0.01 | 504 |
| 9 | 30 | 10.5 | 0.01 | 494 |
| 10 | 30 | 10.5 | 0.40 | 494 |
| 11 | 1st half 50 2nd half 20 | 10.0 11.0 | 0.01 | 494 |

TABLE 6A

| No | Lens diameter & Shape | Glass | Average of upper and lower molds* | Temperature difference between upper and lower molds* | Initial pressure (kg/cm²) |
|---|---|---|---|---|---|
| | | Logarithmic indication of average viscosity (poise) when pressing starts | | | |
| 12 | ⌀ 22 mm, Convex-meniscus | 6.0 | 10.00 | 0 | 100 |
| 13 | ⌀ 22 mm, Convex-meniscus | 7.0 | 9.0 | -15 | 150 |
| 14 | ⌀ 22 mm, Convex-meniscus | 7.0 | 9.0 | 0 | 100 |

*Mold temperature is shown by converted viscosity of glass.

TABLE 6B

| No | Time for maintaining constant temperature (sec) | Cooling rate (°C./min) | Intermediate pressing (1) pressing time (seconds after) | Intermediate pressing (1) pressure (kg/cm²) |
|---|---|---|---|---|
| 12 | 20 | 150 | 3 | 0.01 |
| 13 | 20 | 150 | 3 | 0.01 |
| 14 | 20 | 150 | 3 | 0.01 |

TABLE 6C

| No | Intermediate pressing start time (seconds after) | Intermediate pressing (2) pressure (kg/cm²) | Viscosity when Intermediate pressing (2) ends (logarithm indication) | Final pressure (Kg/cm) | Mold releasing temperature (°C.) |
|---|---|---|---|---|---|
| 12 | 13 | 20 | 11.0 | 0.01 | 484 |
| 13 | 18 | 30 | 10.5 | 0.01 | 494 |
| 14 | 18 | 1st half 50 2nd half 20 | 10.0 11.0 | 0.01 | 494 |

What we claim is:

1. A manufacturing method for molded glass articles comprising the steps of:
   initially pressing and molding a glass molding material having a viscosity in a range of $10^{5.5}$ to $10^8$ poises with a mold heated at a temperature that this glass molding material indicates a viscosity of $10^8$ to $10^{10.5}$ poises, provided that the temperature of the glass molding material is higher than the temperature of the mold,
   decreasing the temperatures of the mold and molded glass to a glass transition point of the glass or below, and removing the molded glass from the mold, wherein from the completion of initial pressing to decrease of the temperature down to the glass transition point or below, a pressure of 0.001 to 0.5 kg/cm$^2$ is continuously exerted to the molded glass.

2. The manufacturing method according to claim 1, wherein the pressure of 0.001 to 0.5 kg/cm$^2$ exerted to the molded glass is given from a weight of an upper mold of the mold.

3. The manufacturing method according to claim 2, wherein the pressure exerted to the molded glass from a weight of an upper mold of the mold is of 0.003 to 0.02 kg/cm$^2$.

4. The manufacturing method according to claim 1, wherein the initial pressure of the glass molding material is of 30 to 350 kg/cm$^2$, and is completed when the glass molding material makes the molded glass having a prescribed thickness.

5. The manufacturing method according to claim 1, wherein the mold glass is released from the mold upon a stop of exertion of the pressure at a temperature between the glass transition point and a temperature of 50° C. below the glass transition point.

6. The manufacturing method according to claim 1, wherein the molded glass is released from an upper mold after the molded glass is cooled down at a temperature of the glass transition point or below, and then the molded glass is released from a lower mold.

7. The manufacturing method according to claim 1 wherein a temperature of an upper mold is set lower than a temperature of a lower mold when the material is initially pressed and molded.

8. The manufacturing method according to claim 1, wherein a temperature of an upper mold is set lower than a temperature of a lower mold when the molded glass is removed from the mold.

9. The manufacturing method according to claim 1, wherein the molded glass article is a glass optical element.

10. The manufacturing method according to claim 1, wherein the glass molding material is a glass preform having a shape such that the center of the mold surface first comes in contact with the molding surface of the preform.

11. The manufacturing method according to claim 1, wherein the glass molding material is a ball shape or a slightly flattened ball shape.

12. The manufacturing method according to claim 1, wherein the glass molding material is a preform having a prescribed shape obtained by grinding the surface.

13. A manufacturing method for molded glass articles comprising the steps of:

initially pressing and molding a glass molding material having a viscosity in a range of $10^{5.5}$ to $10^8$ poises with a mold heated at a temperature that this glass molding material indicates a viscosity of $10^8$ to $10^{10.5}$ poises, provided that the temperature of the glass molding material is higher than the temperature of the mold, decreasing the temperatures of the mold and molded glass to a glass transition point of the glass or below, and removing the molded glass from the mold, wherein from the completion of initial pressing to a decrease of the temperature down to the temperature that this glass molding material indicates a viscosity of $10^{9.5}$ to $10^{12}$ poises, a pressure in a range of 10 to 200 kg/cm$^2$ but smaller than a pressure of the initial pressing is continuously exerted to the molded glass, and then, until the temperature goes down to the glass transition point or below, a pressure of 0.001 to 0.5 kg/cm$^2$ is continuously exerted to the molded glass.

14. The manufacturing method according to claim 13, wherein the pressure of 0.001 to 0.5 kg/cm$^2$ exerted to the molded glass is given from a weight of an upper mold of the mold.

15. The manufacturing method according to claim 14, wherein the pressure exerted to the molded glass from a weight of an upper mold of the mold is of 0.003 to 0.02 kg/cm$^2$.

16. The manufacturing method according to claim 13, wherein the initial pressure of the glass molding material is of 30 to 350 kg/cm$^2$, and is completed when the glass molding material makes the molded glass having a prescribed thickness.

17. The manufacturing method according to claim 13, wherein the mold glass is released from the mold upon a stop of exertion of the pressure at a temperature between the glass transition point and a temperature of 50° C. below the glass transition point.

18. The manufacturing method according to claim 13, wherein the molded glass is released from an upper mold after the molded glass is cooled down at a temperature of the glass transition point or below, and then the molded glass is released from a lower mold.

19. The manufacturing method according to claim 13, wherein a temperature of an upper mold is set lower than a temperature of a lower mold when the material is initially pressed and molded.

20. The manufacturing method according to claim 13, wherein a temperature of an upper mold is set lower than a temperature of a lower mold when the molded glass is removed from the mold.

21. The manufacturing method according to claim 13, wherein the molded glass article is a glass optical element.

22. A manufacturing method for molded glass articles comprising the steps of:

initially pressing and molding a glass molding material having a viscosity in a range of $10^{5.5}$ to $10^8$ poises with a mold heated at a temperature that this glass molding material indicates a viscosity of $10^8$ to $10^{10.5}$ poises, provided that the temperature of the glass molding material is higher than the temperature of the mold, decreasing the temperatures of the mold and molded glass to a glass transition point of the glass or below, and removing the molded glass from the mold, wherein from the completion of initial pressing to a decrease of the temperature down to the temperature that this glass molding material indicates a viscosity of $10^{9.5}$ to $10^{12}$ poises, a pressure of 0.001 to 0.5 kg/cm$^2$ is continuously exerted to the molded glass; then a pressure in a range of 10 to 200 kg/cm$^2$ but smaller than a pressure of the initial pressing is continuously exerted to the molded glass; then until the temperature goes down to the glass transition point or below, a pressure of 0.001 to 0.5 kg/cm$^2$ is continuously exerted to the molded glass.

23. The manufacturing method according to claim 22, wherein the pressure of 0.001 to 0.5 kg/cm$^2$ exerted to the molded glass is given from a weight of an upper mold of the mold.

24. The manufacturing method according to claim 22, wherein the initial pressure of the glass molding material is of 30 to 350 kg/cm$^2$, and is completed when the glass molding material makes the molded glass having a prescribed thickness.

25. The manufacturing method according to claim 22, wherein the mold glass is released from the mold upon a stop of exertion of the pressure at a temperature between the glass transition point and a temperature of 50° C. below the glass transition point.

26. The manufacturing method according to claim 22, wherein the molded glass is released from an upper mold alter the molded glass is cooled down at a temperature of the glass transition point or below, and then the molded glass is released from a lower mold.

27. The manufacturing method according to claim 22, wherein a temperature of an upper mold is set lower than a temperature of a lower mold when the material is initially pressed and molded.

28. The manufacturing method according to claim 22, wherein a temperature of an upper mold is set lower than a temperature of a lower mold when the molded glass is removed from the mold.

29. The manufacturing method according to claim 22, wherein the molded glass article is a glass optical element.

* * * * *